United States Patent [19]
Yoo

[11] Patent Number: 5,936,750
[45] Date of Patent: Aug. 10, 1999

[54] CAMCORDER HAVING A CHARACTERISTIC ADJUSTMENT FUNCTION

[75] Inventor: Kyung-soo Yoo, Suwon, Rep. of Korea

[73] Assignee: Samsung Electronics Co., Ltd., Kyungki-do, Rep. of Korea

[21] Appl. No.: 08/565,126

[22] Filed: Nov. 30, 1995

[30] Foreign Application Priority Data

Nov. 30, 1994 [KR] Rep. of Korea ...................... 94-32213

[51] Int. Cl.⁶ .................................................. H04N 5/76
[52] U.S. Cl. ........................................ 358/906; 358/117
[58] Field of Search .................................. 386/107, 117, 386/46, 93, 1, 40; 358/906, 909.1; 348/96, 176, 190, 175; 396/133; H04N 5/76

[56] References Cited

U.S. PATENT DOCUMENTS

| | | | |
|---|---|---|---|
| 4,158,208 | 6/1979 | Dischert | 348/176 |
| 4,564,856 | 1/1986 | Sanderson et al. | 348/176 |
| 4,584,598 | 4/1986 | Kutaragi | 386/38 |
| 4,626,893 | 12/1986 | Yamanaka | 348/176 |
| 4,654,706 | 3/1987 | Davidson et al. | 348/190 |
| 4,885,643 | 12/1989 | Ichimura et al. | 358/906 |
| 5,003,404 | 3/1991 | Yoshimura et al. | 386/117 |
| 5,065,232 | 11/1991 | Kondo | 358/906 |
| 5,134,431 | 7/1992 | Ishimura et al. | 396/133 |
| 5,142,310 | 8/1992 | Taniguchi et al. | 348/96 |
| 5,173,779 | 12/1992 | Lee | 358/909.1 |
| 5,274,457 | 12/1993 | Kobayashi et al. | 358/906 |
| 5,293,241 | 3/1994 | Song | 358/909.1 |
| 5,543,925 | 8/1996 | Timmermans | 386/40 |
| 5,729,363 | 3/1998 | Aihara et al. | 358/906 |

*Primary Examiner*—Huy T. Nguyen
*Attorney, Agent, or Firm*—Sughrue, Mion, Zinn, Macpeak & Seas, PLLC

[57] ABSTRACT

A camcorder having a characteristic adjustment function includes a key input unit; a functional unit for performing a camcorder function and having an adjustable characteristic and which outputs an adjusted characteristic signal containing characteristic-adjusted information when the adjustable characteristic is adjusted; a memory unit for storing characteristic adjustment information of the functional unit and the adjusted characteristic information; a display for displaying the characteristic adjustment information stored in the memory unit for said functional unit; and a main controller for controlling the display and the memory unit according to an input signal from the key input unit to display the characteristic adjustment information and to store the adjusted characteristic information in the memory unit.

18 Claims, 2 Drawing Sheets

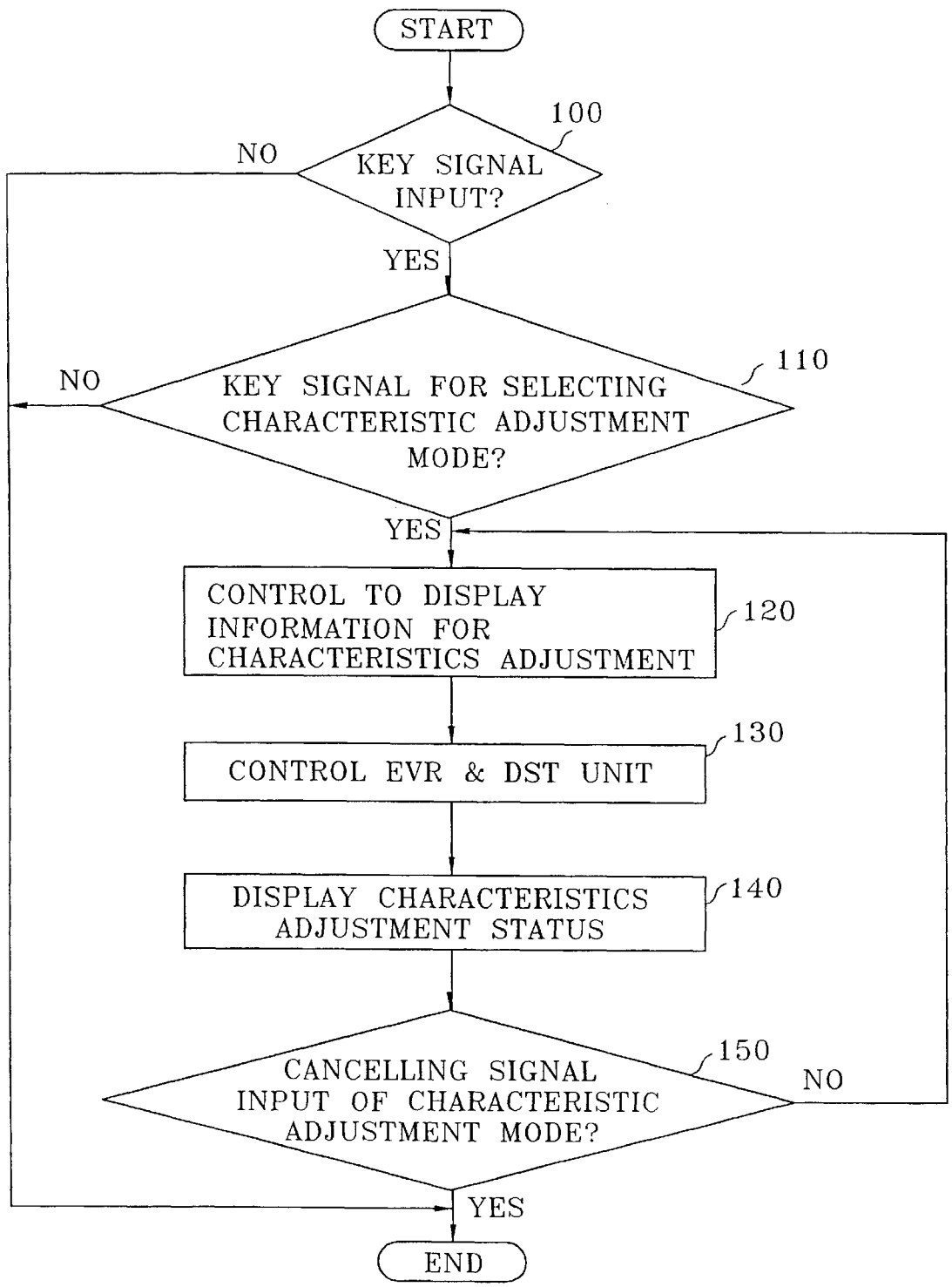

CAMCORDER HAVING A CHARACTERISTIC ADJUSTMENT FUNCTION

BACKGROUND OF THE INVENTION

1. Field of the Invention

The present invention relates to an apparatus for adjusting gain characteristics of respective functional blocks, or units, of a camcorder.

2. Description of Related Art

Gain adjustment with regard to each of the functional blocks in a camcorder has usually been made in a production step during manufacture of the camcorder, and in an after-service step while the camcorder is being serviced to resolve problems occurring in the course of using the camcorder.

A separate apparatus, or jig, is required to adjust gain characteristics in a conventional camcorder. In other words, adjustment of the camcorder characteristics is achieved by altering a gain value of each of the functional blocks established during the design of the camcorder by interfacing a controller incorporated in the jig with a main controller of the camcorder.

However, since a separate control jig is needed for each camcorder model in order to adjust the characteristics for that particular camcorder model, there arises a problem in that manufacturers must maintain separate and unique jigs for each of the camcorder models manufactured. Also, in the case of repairing the camcorder, or replacing spare parts thereof, adjustment of a camcorder characteristic may be necessary. However, a problem can arise in this instance since the camcorder characteristic cannot be adjusted if a corresponding control jig is not available.

SUMMARY OF THE INVENTION

Therefore, to solve the above problem, it is an object of the present invention to provide a camcorder for adjusting gain characteristics of respective functional blocks of the camcorder without requiring a separate control jig.

To accomplish the above object of the present invention, there is provided a camcorder having a characteristic adjustment function, the apparatus comprising:

a key input unit; a functional unit which generates a characteristic-adjusted signal according to input characteristic information; a memory unit for storing information concerned with a characteristic adjustment of the functional unit and the adjusted characteristic information; a display unit for displaying information related to the adjusted characteristic stored in the memory unit; and a main controller, controlling general functions of the camcorder, for controlling the display unit and the memory unit according to a user's input signal from the key input unit, in order to display the information concerned with the characteristic adjustment and to store the adjusted characteristic information in the memory unit.

BRIEF DESCRIPTION OF THE DRAWINGS

The present invention will be described in more detail with reference to the accompanying drawing in which:

FIG. 2 is a flowchart illustrating the control of a main controller shown in FIG. 1.

DETAILED DESCRIPTION OF THE INVENTION

Figure 1:
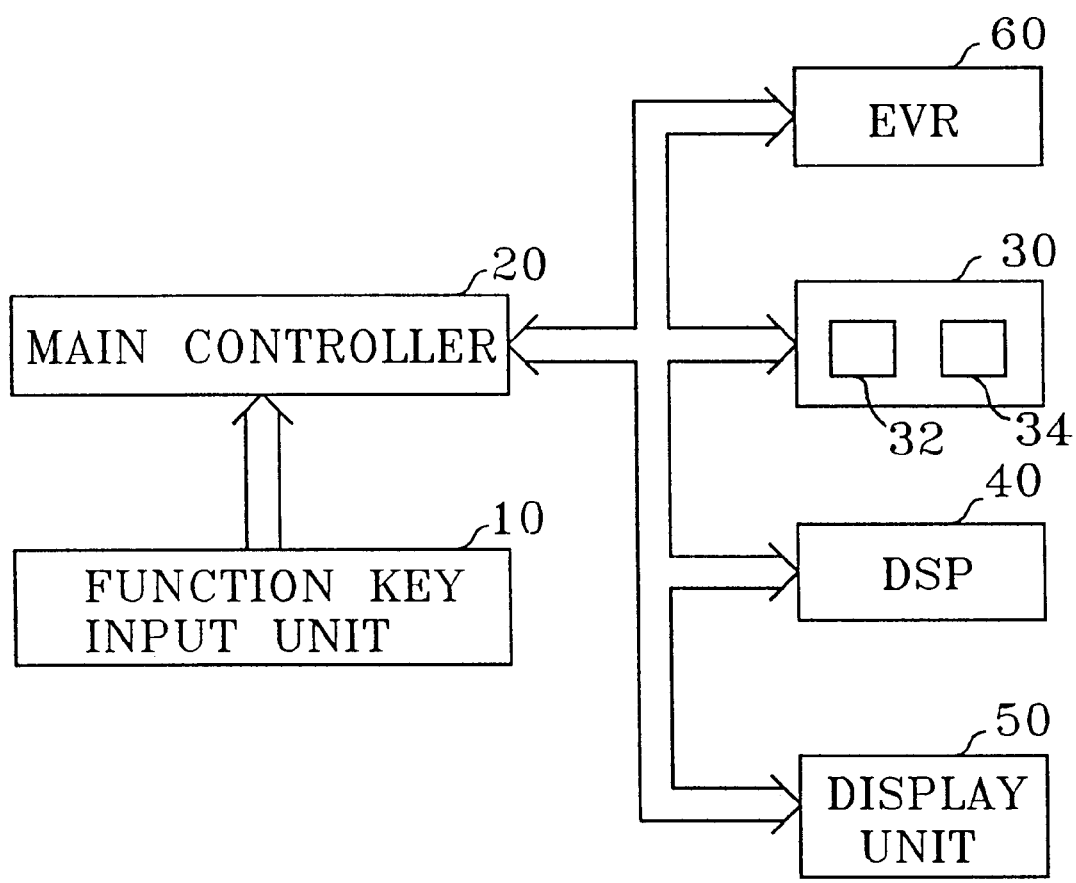
FIG. 1 is a block diagram showing a camcorder according to the present invention.

FIG. 1 shows a camcorder according to the present invention. A function key input unit 10 includes function keys controlling power to the camcorder's main body or for selecting a basic camcorder operation such as a photographing operation. The function key input unit 10 according to a preferred embodiment of the present invention has no separate function keys for adjusting characteristics of the camcorder. However, the apparatus according to the present invention is designed so that a characteristic control mode is selected or characteristic information which is newly determined, with regard to each of the functional blocks, is stored in a memory unit 30 through a combination of conventional function keys.

A main controller 20, which responds to a key signal generated by function key input unit 10, performs general functions by controlling peripheral devices. Main controller 20 also controls the characteristic adjustment function based on data stored in the memory unit 30, which includes a first memory 32 for storing information for adjusting characteristics of the camcorder and a second memory 34 for storing information relating to the adjusted characteristic. The first memory 32 preferably is a read-only memory (ROM) and the second memory 34 is preferably an electrically erasable and programmable read-only memory (EEPROM).

A digital signal processor (DSP) unit 40 generates gain-adjusting data according to the signal generated by main controller 20, and an electric variable resistor (EVR) 60 performs a gain control for functional blocks (not shown) to be operated in an analog manner under the control of main controller 20. A display unit 50 displays information relating to the camcorder characteristics adjustment supplied from main controller 20 for a display to a user. A display unit 50 can be a 7-segment display or liquid crystal panel. Preferably, however, display unit 50 is a viewfinder which displays a video signal together with a character signal.

The operation of the apparatus shown in FIG. 1 is described below with reference to FIG. 2, as follows.

The main controller 20 judges whether or not a key signal is input from the function key input unit 10 (step 100). When the key signal is input, the main controller 20 judges whether or not the input key signal is for selecting a characteristic adjustment mode (step 110). If the characteristic adjustment mode is selected in step 110, main controller 20 reads data from first memory 32 of memory unit 30, which is predetermined data related to the characteristic adjustment, with regard to each of the stored functional blocks. Further, main controller 20 controls display unit 50 to display the read information (step 120). The characteristic adjustment information, to be displayed via display unit 50, includes operation order and gain control values, which can be input by the user, so that a user can easily adjust a characteristic of each functional block.

While a user watches display unit 50 and presses a key on function key input unit 10 in order to adjust characteristics of each functional block, main controller 20 controls EVR 60 and DSP unit 40 according to the specific key that was pressed (step 130). That is, in step 130, main controller 20 supplies the selected gain control value with respect to the functional block, in which the gain control value is input by a user from function key input unit 10 to a corresponding device, such as EVR 60 or DSP unit 70.

EVR 60 supplies gain values, in accordance with the input gain control values, to each functional block (not shown), and DSP unit 40 generates a gain-controlled signal in accordance with the gain control value. Main controller 20 controls display unit 50 so that the adjusted characteristic information for each functional block is displayed (step 140). Main controller 20 then determines whether or not a key signal for cancelling the characteristic adjustment mode is input via the function key input unit 10 (step 150). If the key signal for cancelling the characteristics adjustment mode is not input in step 150, main controller 20 iteratively process steps 120 to 140. When the cancel signal is input in step 150, main controller 20 stores the currently-adjusted characteristic information in second memory 34 and finishes the characteristic adjustment mode.

As described above, the camcorder in accordance with the present invention can perform characteristic adjustment with regard to each of the functional blocks of the camcorder without requiring use of a separate jig device, thereby resolving problems in the conventional camcorder for which a separate jig would otherwise be required for performing a characteristic adjustment.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A camcorder having a characteristic adjustment function, comprising:

a key input unit;

a functional unit for performing a camcorder function and having an adjustable characteristic and which outputs an adjusted characteristic signal containing adjusted characteristic information when said adjustable characteristic is adjusted:

a memory unit for storing characteristic adjustment information of said functional unit and said adjusted characteristic information;

a display for displaying said characteristic adjustment information and said adjusted characteristic information stored in said memory unit for said functional unit; and a main controller, responsive to an input signal from said key input unit, for controlling said functional unit to adjust the adjustable characteristic thereof, and controlling said display and said memory unit to display the characteristic adjustment information and adjusted characteristic information and to store said adjusted characteristic information in said memory unit, wherein said adjusted characteristic information is based on the input signal from said key input unit.

2. The camcorder according to claim 1, wherein said memory unit comprises a non-volatile memory for storing the adjusted characteristic information.

3. The camcorder according to claim 2, wherein a gain is the adjustable characteristic and said functional unit is an electric variable resistor (EVR) which performs a gain control on the gain.

4. The camcorder according to claim 2, wherein said key input unit is operated by a user to adjust said adjustable characteristic while said characteristic adjustment information and said adjusted characteristic information are displayed on said display.

5. The camcorder according to claim 1, wherein the characteristic adjustment information displayed via said display includes an operation order and characteristic adjustment values input by a user.

6. The camcorder according to claim 5, wherein a gain is the adjustable characteristic and said functional unit is an electric variable resistor (EVR) which performs a gain control on the gain.

7. The camcorder according to claim 5, wherein said key input unit is operated by a user to adjust said adjustable characteristic while said characteristic adjustment information and said adjusted characteristic information are displayed on said display.

8. The camcorder according to claim 1, wherein said main controller controls said display to display the characteristic adjustment information stored in said memory unit when an input key signal for selecting a characteristic adjustment mode is output from said key input unit, supplies functional unit characteristic adjustment information based on said characteristic adjustment mode, wherein said functional unit generates said adjusted characteristic information when an input key signal for selecting characteristic information with regard to said functional unit is output from said key input unit, and controls said memory unit to store said adjusted characteristic information when an input key signal for ending said characteristic adjustment mode is output from said key input unit.

9. The camcorder according to claim 8, wherein a gain is the adjustable characteristic and said functional unit is an electric variable resistor (EVR) which performs a gain control on the gain.

10. The camcorder according to claim 8, wherein said key input unit is operated by a user to adjust said adjustable characteristic while said characteristic adjustment information and said adjusted characteristic information are displayed on said display.

11. The camcorder according to claim 1, wherein said memory unit comprises first and second memories, wherein said first memory stores predetermined characteristic adjustment information and said second memory stores the adjusted characteristic information.

12. The camcorder according to claim 11, wherein said key input unit is operated by a user to adjust said adjustable characteristic while said characteristic adjustment information and said adjusted characteristic information are displayed on said display.

13. The camcorder according to claim 1, wherein a gain is the adjustable characteristic and said functional unit is an electric variable resistor (EVR) which performs a gain control on the gain.

14. The camcorder according to claim 11, wherein a gain is the adjustable characteristic and said functional unit is an electric variable resistor (EVR) which performs a gain control on the gain.

15. The camcorder according to claim 1, wherein said key input unit is operated by a user to adjust said adjustable characteristic while said characteristic adjustment information and said adjusted characteristic information are displayed on said display.

16. A method for adjusting a characteristic of a functional unit of a camcorder, the camcorder having a key input unit, comprising:

displaying predetermined information relating to a characteristic adjustment of the functional unit, upon detection of a signal input from the key input unit indicating a characteristic adjustment mode is selected;

adjusting the characteristic of the functional unit and generating adjusted characteristic information, in response to the signal input from the key input unit;

storing in a memory said adjusted characteristic information relating to the adjusted characteristic; and displaying said adjusted characteristic information relating to the adjusted characteristic.

17. The method according to claim 16, wherein a gain is said characteristic and the functional unit is an electric variable resistor (EVR) which performs a gain control on the gain, and gain adjustment information is said adjustment characteristic information.

18. The method according to claim 16, wherein said key input unit is operated by a user to perform said adjusting the characteristic of the functional unit while said adjusted characteristic information is displayed.

* * * * *